(12) United States Patent
Fukuda et al.

(10) Patent No.: US 9,619,361 B2
(45) Date of Patent: Apr. 11, 2017

(54) PERFORMANCE PROFILING APPARATUS AND PERFORMANCE PROFILING METHOD

(71) Applicant: FUJITSU LIMITED, Kawasaki-shi, Kanagawa (JP)

(72) Inventors: Takatoshi Fukuda, Sagamihara (JP); Shuji Takada, Kawasaki (JP); Kenjiro Mori, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 316 days.

(21) Appl. No.: 14/086,611

(22) Filed: Nov. 21, 2013

(65) Prior Publication Data

US 2014/0282435 A1 Sep. 18, 2014

(30) Foreign Application Priority Data

Mar. 18, 2013 (JP) .................................. 2013-055338

(51) Int. Cl.
*G06F 9/44* (2006.01)
*G06F 11/34* (2006.01)

(52) U.S. Cl.
CPC ........ *G06F 11/348* (2013.01); *G06F 11/3419* (2013.01); *G06F 2201/88* (2013.01)

(58) Field of Classification Search
CPC .............. G06F 9/3851; G06F 11/3636; G06F 11/3447; G06F 2201/86; G06F 11/3466; G06F 2201/88; G06F 11/348
See application file for complete search history.

(56) References Cited

U.S. PATENT DOCUMENTS

| 5,768,500 | A | 6/1998 | Agrawal et al. |
| 6,332,212 | B1 * | 12/2001 | Organ .................. G06F 11/323 714/E11.181 |
| 2005/0155019 | A1 * | 7/2005 | Levine ................ G06F 11/3636 717/127 |
| 2007/0043531 | A1 * | 2/2007 | Kosche ............... G06F 11/3447 702/182 |
| 2008/0183430 | A1 | 7/2008 | Kitsunai et al. |

(Continued)

FOREIGN PATENT DOCUMENTS

| JP | 63-37436 | 2/1988 |
| JP | 1-180647 | 7/1989 |

(Continued)

OTHER PUBLICATIONS

Office Action issued by the Japanese Patent Office on Aug. 2, 2016 in corresponding Japanese patent application No. 2013-055338.

*Primary Examiner* — Tuan Vu
(74) *Attorney, Agent, or Firm* — Staas & Halsey LLP

(57) ABSTRACT

A performance profiling apparatus includes: a plurality of counters provided for a routine included in a program; a storage section configured to store an instruction of the program and an identification information indicating the routine of the program; a processor configured to read the instruction from the storage section and to execute a process according to the instruction; and a counter controller configured to, at the time of reading the instruction of the processor, receive the identification information of the instruction which is output from the storage section with the instruction and to instruct a first counter designated by the identification information to count up.

14 Claims, 6 Drawing Sheets

(56) References Cited

U.S. PATENT DOCUMENTS

2009/0319758 A1* 12/2009 Kimura ................ G06F 9/3851
712/220
2010/0262870 A1 10/2010 Davies

FOREIGN PATENT DOCUMENTS

| | | |
|---|---:|---:|
| JP | 8-30494 | 2/1996 |
| JP | 11-39192 | 2/1999 |
| JP | 2002-244890 | 8/2002 |
| JP | 2004-348635 | 12/2004 |
| JP | 2005-215816 | 8/2005 |
| JP | 2008-186080 | 8/2008 |
| JP | 2010-244552 | 10/2010 |

* cited by examiner

PERFORMANCE PROFILING APPARATUS AND PERFORMANCE PROFILING METHOD

CROSS-REFERENCE TO RELATED APPLICATION

This application is based upon and claims the benefit of priority from the prior Japanese Patent Application No. 2013-055338 filed on Mar. 18, 2013, the entire contents of which are incorporated herein by reference.

FIELD

Embodiments are related to a performance profiling apparatus and a performance profiling method.

BACKGROUND

A profiler is a tool for analyzing the performance of a program. The profiler collects (profiles) information during an execution of a program in an information processing system. A sampling-type profiler uses an interrupt of an operating system to probe a program counter of the program to be measured at regular intervals and records the value of the program counter. After the execution of the program is ended, an execution time of the entire program or an execution time of each subroutine (function) called within the program is extracted from the records to analyze which portion of the program requires a time for execution. In the sampling-type profiler, the interrupt of the operating system is used and thus, a sampling interval for program execution information is large and accuracy is low, but a target program for measuring executed at a normal speed is analyzed.

Japanese Laid-Open Patent Publication No. H8-30494, Japanese Laid-Open Patent Publication No. 2005-215816, Japanese Laid-Open Patent Publication No. H11-39192, Japanese Laid-Open Patent Publication No. 2002-244890, and Japanese Laid-Open Patent Publication No. 2010-244552 disclose related technologies.

SUMMARY

According to an aspect of the embodiments, a performance profiling apparatus includes: a plurality of counters provided for a routine included in a program; a storage section configured to store an instruction of the program and an identification information indicating the routine of the program; a processor configured to read the instruction from the storage section and to execute a process according to the instruction; and a counter controller configured to, at the time of reading the instruction of the processor, receive the identification information of the instruction which is output from the storage section with the instruction and to instruct a first counter designated by the identification information to count up.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In a profiling, for example, a routine which acquires and records a value of a performance counter before and after calling a subroutine (function) within a program is embedded to record a counter value obtained when an execution of the subroutine (function) is started and is ended as log data. The log data is analyzed after the execution of the program is ended, such that an execution time or characteristic of the subroutine (function) is acquired. However, a re-compiling is needed after embedding codes of the routine for the profile into a source code of the program. Further, the routine embedded for acquiring the value of the performance counter may cause a program operation to differ from an original program operation.

In the profiling, for example, an event, which occurs in a Central Processing Unit (CPU), is counted and an interrupt is generated when a count value reaches to a certain value. The number of times that the event has occurred in each subroutine (function) by an interrupt handler is recorded as log data. A process routine by the interrupt handler is inserted into the program and thus, the program operation may differ from an original program operation.

The number of clocks for execution is counted for each task, and a task ID and the number of clocks for execution are acquired at a task switching timing. The number of clocks for execution is accumulated and stored for every task based on the task ID, such that the execution information of the program is collected. Further, a counter which measures the execution time and the number of execution times in a unit of a program or module is provided. An instruction to start and stop counting is issued to the counter from the CPU at the beginning and the end of the program or module to be measured and thus, an execution time and the number of execution times are measured.

Figure 1:
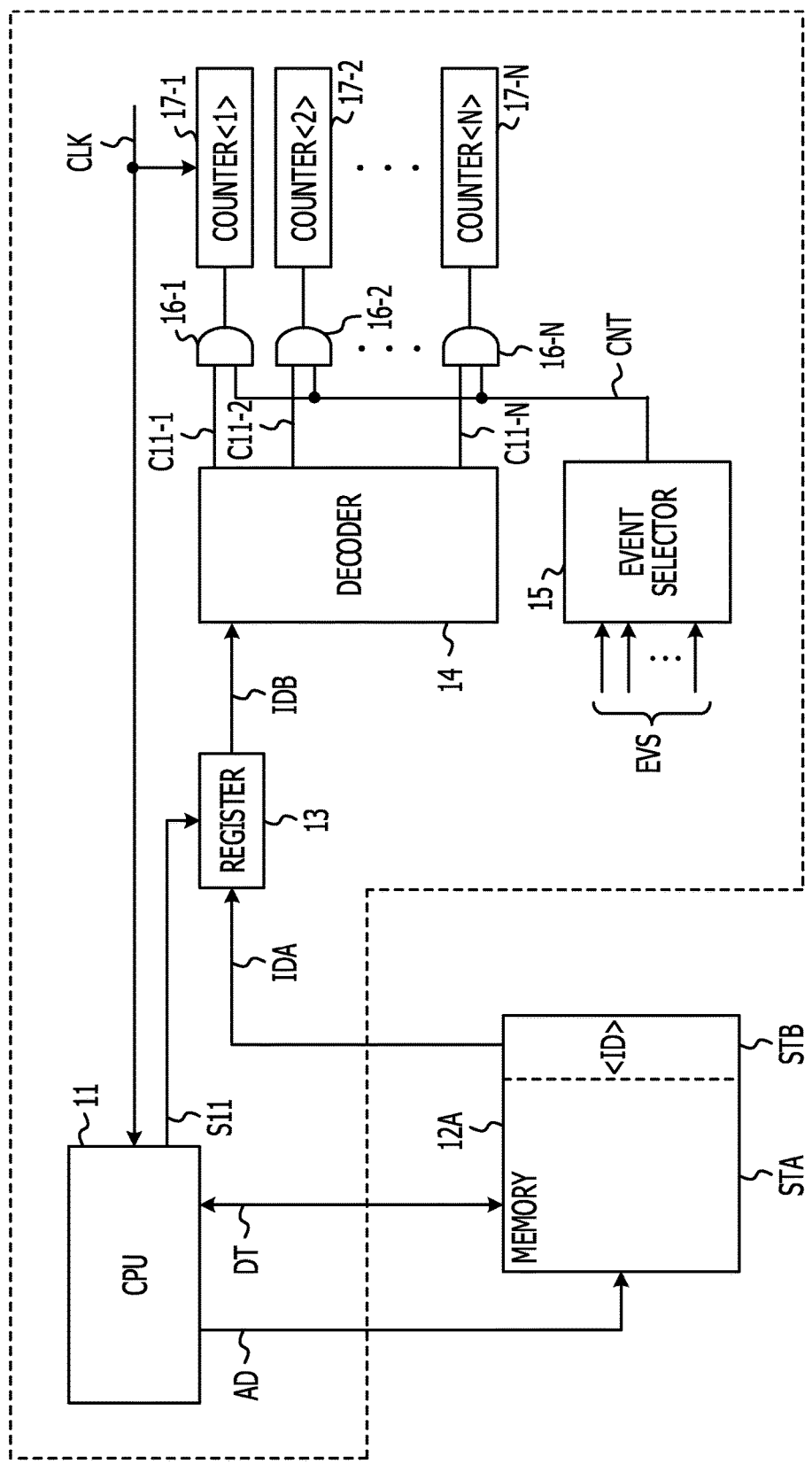
FIG. 1 illustrates an example of a information processing system.

FIG. 1 illustrates an example of an information processing system. An information processing system illustrated in FIG. 1 may be a performance profiling apparatus. The information processing system illustrated in FIG. 1 includes a Central Processing Unit (CPU) 11, a main memory (main storage device) 12A, a register 13, a decoder 14, an event selector 15, an AND gate (logical AND operation circuit) 16-$i$, and a counter<$i$> 17-$i$. "$i$" is a subscript, $i=1$–$N$ ($N$ is an any natural number) ("$i$" is also the same in the following). For example, the CPU 11, the register 13, decoder 14, the event selector 15, the AND gate 16-$i$ and the counter<$i$> 17-$i$ may be formed on a single chip as an operation processing apparatus in information processing system illustrated in FIG. 1.

The CPU 11 operates using a clock CLK supplied as an operation clock, and reads and executes the program stored in the main memory. For example, the CPU 11 outputs an address AD to the main memory 12A to read (fetch) an instruction from the main memory 12A. The CPU 11 decodes the instruction read from the main memory 12A and supplied as data DT, and executes a process according to a result of the decoding. The CPU 11 performs reading or writing of the data DT from or to the main memory 12A as needed when executing the processing according to the instruction. The CPU 11 asserts a signal S11 when reading (fetching) the instruction from the main memory 12A.

Data including the instruction of the program is stored in the main memory 12A. The program ID added as an identification information representing which main routine or subroutine (function) the instruction is relevant to, may be stored in the same word in which the instruction of the program is stored. A data storage area STA in which data including an instruction is stored and a program ID storage area STB in which a program ID added as identification information is stored, are included in a single word. For example, the program ID storage area STB in each word has a plurality of bits. The number of bits of the program ID storage area STB may be determined according to the number of routines (functions) that may be executed with a program.

Figure 2:
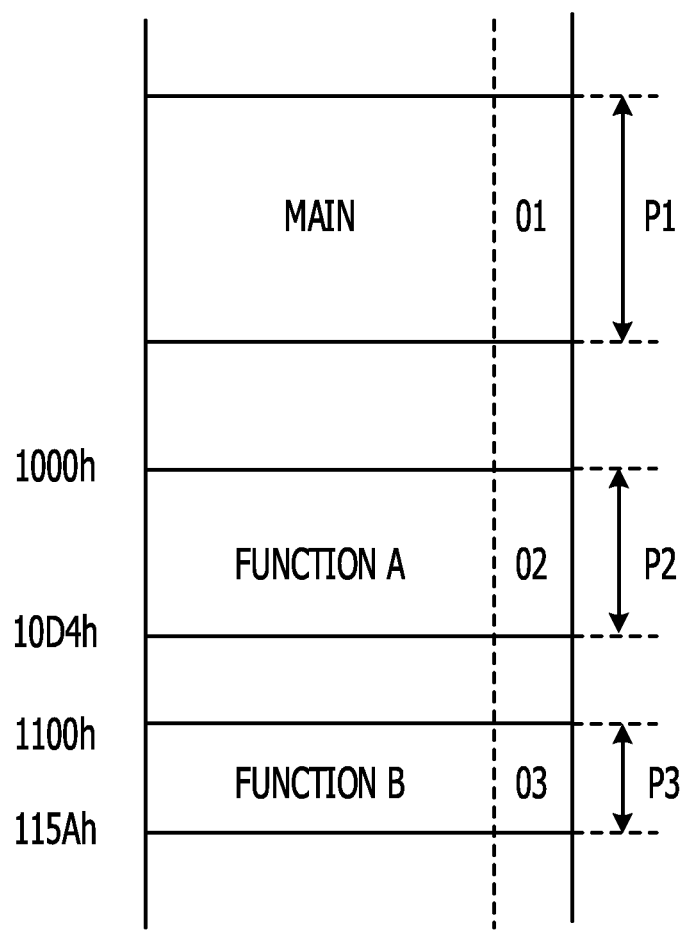
FIG. 2 illustrates an example of a main memory.

The program ID added as the identification information is added to every routine (function) included in the program to be measured at compile time in which source codes of the program is converted into object codes. FIG. 2 illustrates an example of a main memory. As illustrated in FIG. 2, when the program to be measured is deployed in an executable form in the main memory 12A, the instruction of the program and the added program ID are stored in the main memory 12A. In FIG. 2, "01" is assigned to the main routine of the program as the program ID, "02" is assigned to a function (A) called from the main routine, and "03" is assigned to a function (B) called from the main routine.

When the CPU 11 reads (fetches) the instruction, the program ID stored in the same word together with the instruction is output from the main memory 12A, such that the instruction is supplied to the CPU 11 and the program ID is supplied to the register 13. In this case, the signal S11 output from the CPU 11 is asserted and the program ID is maintained in the register 13. By doing this, the register 13 receives the program ID (IDA) supplied from the main memory 12A at the time of an instruction fetch by the CPU 11 and maintains the program ID in a case other than the instruction fetch time. Therefore, even when the CPU 11 accesses the main memory 12A in order to read data other than the instruction, the program ID which corresponds to the instruction executed by the CPU 11 is maintained in the register 13. The register 13 outputs the program ID being maintained as an output IDB.

The decoder 14 decodes the output IDB of the register 13, for example, the program ID maintained in the register 13. The decoder 14 asserts a count signal C11-$i$ which instructs the counter<$i$> designated by the program ID to count up. For example, the output of the count signal C11-$i$ is set to "1". For example, when the program ID input is "01", the decoder 14 asserts a count signal C11-1, and when the program ID input is "02", the decoder 14 asserts the count signal C11-2.

The event selector 15 selects whether counting up is performed at the time of the occurrence of various events in the information processing system. When an execution time (the number of clocks for execution) of each routine (function) is measured, the event selector 15 asserts a count enable signal CNT to be output (set the output to "1"). When the number of times that the event has occurred is measured during the execution of each routine (function), the event selector 15 asserts the count enable signal CNT to be output when an event detection signal EVS indicating that a target event has occurred is input. For example, in a case where the number of times that the cache miss has occurred during execution of each routine (function) is measured, when the occurrence of the cache miss is represented by the event detection signal EVS, the count enable signal CNT is asserted.

The AND gate 16-$i$ and the counter<$i$> 17-$i$ may be provided to be corresponded to each program ID. The count signal C11-$i$ output from the decoder 14 and the count enable signal CNT output from the event selector 15 are input to the AND gate 16-$i$. The counter<$i$> 17-$i$ operates at the same clock CLK as an operation clock of the CPU 11, and performs a count operation according to an output of a corresponding AND gate 16-$i$. The counter<$i$> 17-$i$ counts up by increasing a count value for every period of the clock CLK by one when the output of the corresponding AND gate 16-$i$ is asserted, for example, the output is "1".

When the execution time of each routine (function) is measured, an output of the AND gate 16-$i$ corresponding to the program ID of routine (function) being executed is asserted, and the count value of the counter<$i$> 17-$i$ which receives the output is counted up for every period of the clock CLK. For example, each counter<$i$> 17-$i$ counts the number of clocks for execution of the corresponding routine (function). Therefore, the counter value of each counter<$i$> 17-$i$ is read after an execution of the program to be measured is ended and thus, the execution time of each routine (function) included in the program to be measured may be obtained.

When the number of times that the event has occurred is measured during execution of each routine (function), an output of the AND gate 16-$i$ corresponding to the program ID of routine (function) being executed is asserted at the time of occurrence of a target event, and the count value of the counter<$i$> 17-$i$ which receives the output is counted up. For example, each counter<$i$> 17-$i$ counts the number of times that the event has occurred during execution of the corresponding routine (function). The counter value of each counter<$i$> 17-$i$ is read after an execution of the program to be measured is ended and thus, the execution time of each routine (function) included in the program to be measured may be obtained.

In the following description, the counter<1> 17-1 may be corresponded to the program ID "01", the counter<2> 17-2 may be corresponded to the program ID "02", and the counter<3> 17-3 may be corresponded to the program ID "03".

The CPU 11 outputs the top address of the main routine to main memory 12A to read (fetch) a first instruction of the main routine from the main memory 12A, such that the CPU 11 performs a process according to the instruction. When the first instruction of the main routine is read from the main memory 12A, the program ID of the main routine stored in the same word is also read from the main memory 12A and maintained in the register 13.

Since the program ID of the main routine is "01", the decoder 14 decodes the output of the register 13 to select the counter<1> 17-1, and asserts the count signal C11-1. The count enable signal CNT output from the event selector 15 has been asserted. Accordingly, the counter<1> 17-1 counts up by increasing the count value for every period of the clock CLK by one. When the main routine runs on the CPU 11, "01" is output as the program ID and thus, the counter<1> 17-1 counts up for every period of the clock CLK.

Thereafter, when the main routine calls the function (A) or the function (B) and the function (A) or the function (B) is started to run on the CPU, the program ID output from the main memory 12A is changed. For example, when the main routine calls the function (A) and a process operation is moved from the main routine to the function (A), "02" is output as the program ID. For example, when the main routine calls the function (B) and a process operation is moved from the main routine to the function (B), "03" is output as the program ID.

At the instruction fetch time, the register 13 receives the program ID output from main memory 12A, and the decoder 14 selects the counter<i> 17-$i$ corresponding to the program ID. For example, when the function (A) runs on the CPU 11, the counter<2> 17-2 is selected, and the counter<2> 17-2 counts up by increasing a count value for every period of the clock CLK by one. For example, when the function (B) runs on the CPU 11, the counter<3> 17-3 is selected, and the counter<3> 17-3 counts up by increasing a count value for every period of the clock CLK by one.

When the process of the function (A) or the function (B) is ended and the process operation is returned to the main routine, "01" is output again as the program ID. Accordingly, the counter<1> 17-1 is selected, the counter<1> 17-1 counts up by increasing a count value for every period of the clock CLK by one. Each of the counter values of each counter<i> 17-$i$ at the time when the program to be measured is executed and ended may correspond to the number of clock required for execution by the counter corresponding to each routine (function), for example, an execution time.

The program ID which indicates a routine being executed by the CPU 11 is supplied to a circuit independent from the CPU 11 and thus, a program execution information is collected in parallel with the processing of instruction in the CPU 11. Therefore, a performance profiling may be performed without affecting the original program operations. Information indicating which routine (function) is being executed for every period of the clock CLK with which the CPU 11 operates may be acquired. The program execution information is collected at a short sampling interval and thus, the performance profiling having a high degree of accuracy may be performed.

The same program ID as a called routine or a separate program ID may be assigned to a function and/or file loaded to the main memory during execution of a program, such as a dynamic linkage library (DLL). A program ID to be assigned may be selected. It may be selected whether to measure either an execution time of the program, such as the DLL, or an execution time of the entire routine called the program, such as the DLL.

In FIG. 1, an exclusive program ID storage area STB is prepared in the main memory 12A in order to store the program ID added as the identification information. The main memory of the information processing system which performs the performance profiling includes a storage area for an error correction code (ECC) in order to increase the reliability of the system in normal operations.

Figure 3:
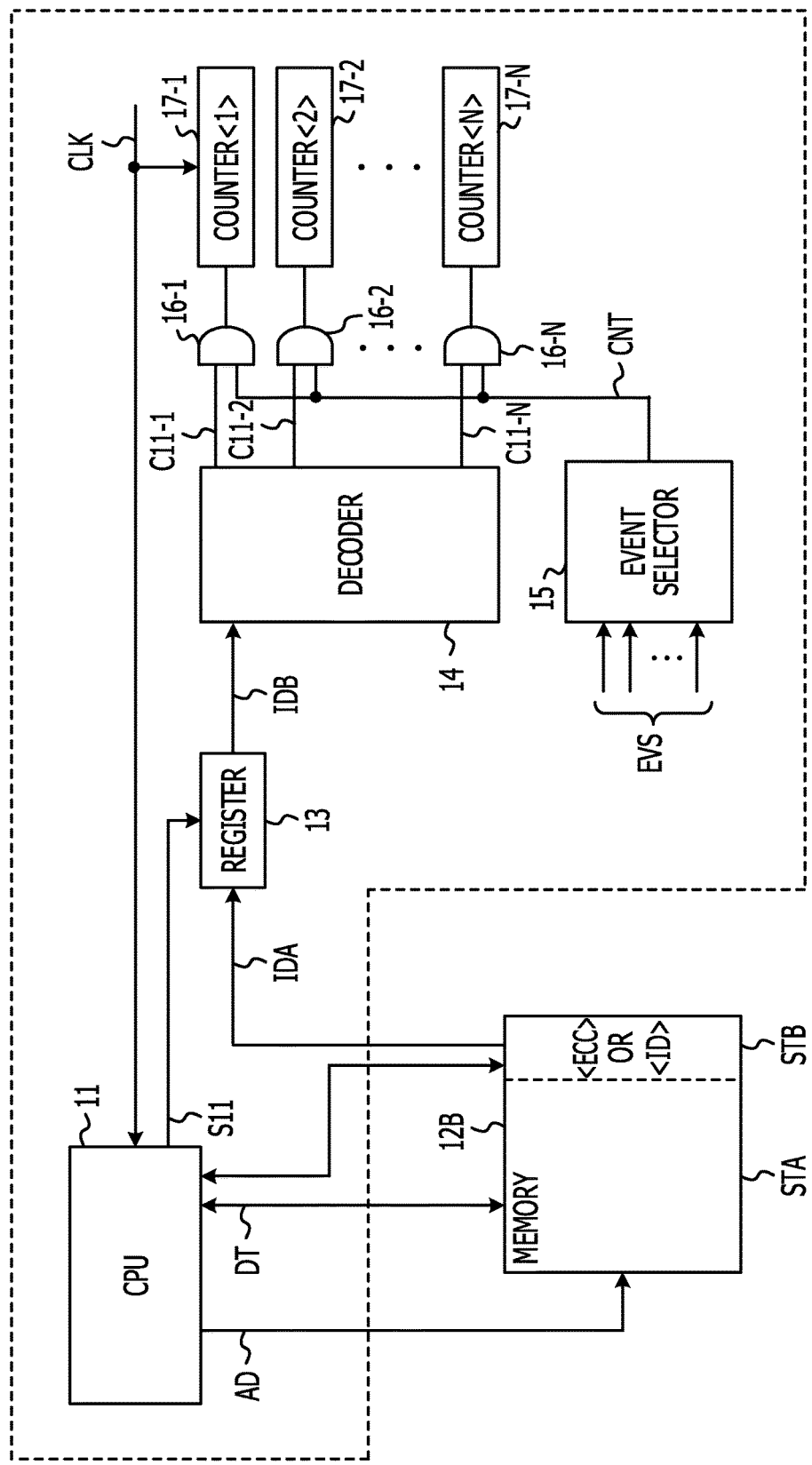
FIG. 3 illustrates an example of a information processing system.

FIG. 3 illustrates an example of an information processing system. As illustrated in FIG. 3, an area in which the ECC is stored during a normal operation may be used as the program ID storage area STB which stores the program ID during performing of the performance profiling in the main memory 12B. In FIG. 3, the same reference numerals are given to substantially the same or similar elements as those illustrated in FIG. 1 and description thereof may be omitted or reduced.

As illustrated in FIG. 3, an operation mode of the information processing system indicating whether a normal operation is to be performed or the performance profiling is to be performed may be switched by, for example, a signal from outside or a register setting. The CPU 11 may not perform an error correction using the ECC in an operation mode of performing the performance profiling. The exclusive program ID storage area STB for storing the program ID may not be needed to be provided in the main memory and a main memory capacity may be decreased to reduce cost.

Figure 4:
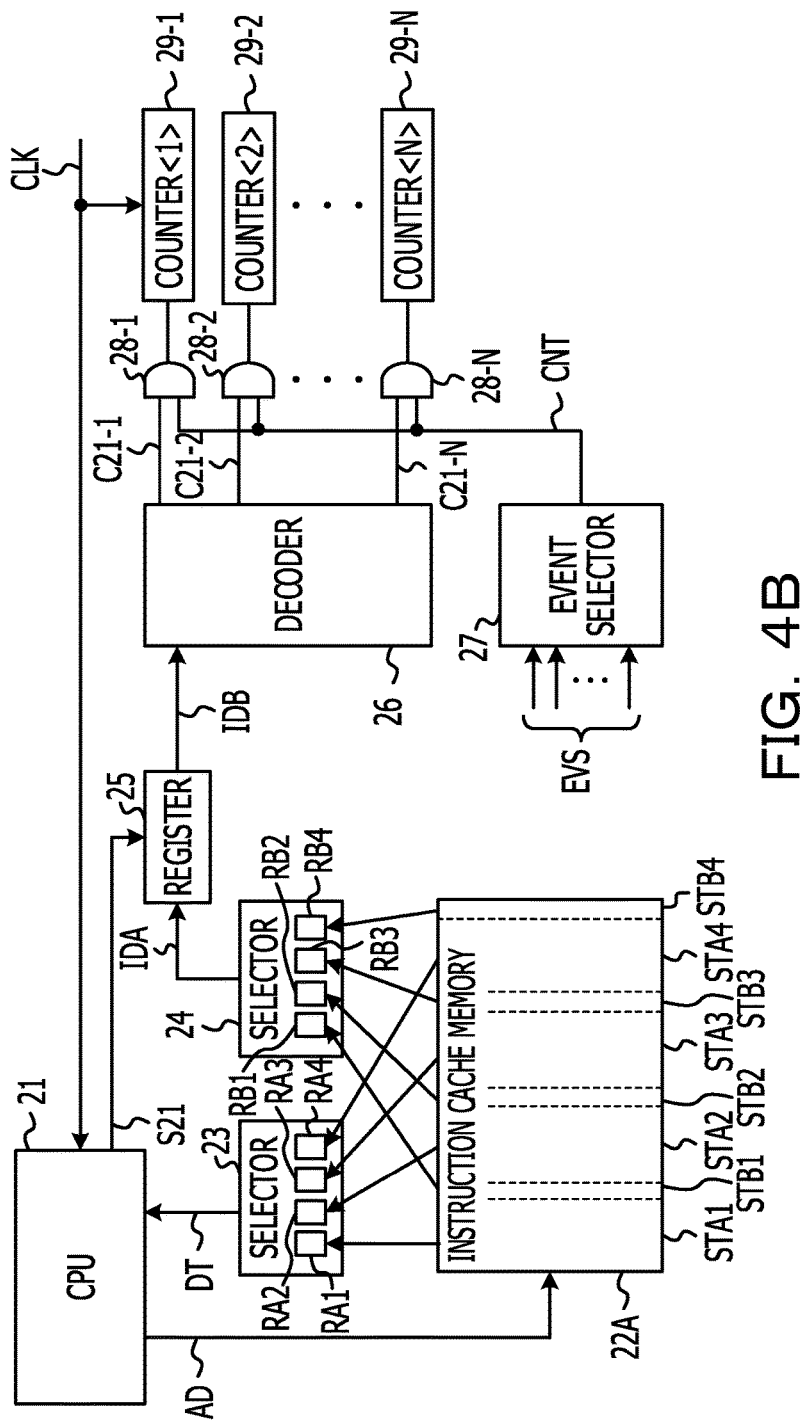
FIG. 4A illustrates an example of an operation processing apparatus.
FIG. 4B illustrates an example of a data storage area of a cache.

FIG. 4A illustrates an example of an operation processing apparatus. The operation processing apparatus illustrated in FIG. 4A may be a performance profiling apparatus. The operation processing apparatus illustrated in FIG. 4A includes a CPU 21, an instruction cache memory 22A, selectors 23, 24, a register 25, a decoder 26, an event selector 27, an AND gate 28-$i$, and a counter<i> 29-$i$. For example, the operation processing apparatus illustrated in FIG. 4A may be formed on a single chip. For example, the cache memory illustrated in FIG. 4A may include an instruction cache memory 22A and a data cache memory.

The CPU 21 may correspond to the CPU 11 illustrated in FIG. 1. The CPU 21 operates using the clock CLK supplied as an operation clock, and reads and executes the program stored in the main memory through the instruction cache memory 22A. The CPU 21 asserts a signal S21 at an instruction fetch time.

The instruction cache memory 22A may be a cache memory storing some of data of the main memory, and stores some of instructions of the program stored in the main memory. In FIG. 4A, the instruction cache memory 22A in which one cache line corresponding to a management unit (a unit accessed concurrently) is composed of 4 (four) words is illustrated. A first data storage area STA1 and a first program ID storage area STB1 may be included in a first word, and a second data storage area STA2 and a second program ID storage area STB2 may be included in a second word. A third data storage area STA3 and a third program ID storage area STB3 may be included in a third word, and a fourth data storage area STA4 and a fourth program ID storage area STB4 may be included in a fourth word.

FIG. 4B illustrates an example of a data storage area in a cache. As illustrated in FIG. 4B, each of the instructions <DAT1>-<DAT4> may be stored in each of data storage areas STA1-STA4, respectively. Each of the program IDs <ID1>-<ID4> as identification information indicating which routine (function) the instruction stored in the same area is relevant to, is stored in each of the program ID storage areas STB1-STB4, respectively. For example, the program ID storage areas STB1-STB4 may have the plurality of bits of which number is determined according to the number of the routines (functions) that may be performed with a single program. The program ID added as the identification information may be substantially the same or similar to the program ID described above.

The selectors 23 and 24 maintains data for one cache line read from the instruction cache memory 22A. The selector 23 maintains the instructions stored in each of data storage areas STA1-STA4 of a first to a fourth words read from the instruction cache memory 22A in a first to a fourth instruction maintaining units RA1-RA4. The selector 24 maintains the instructions stored in each of the program ID storage areas STB1-STB4 of a first to a fourth words read from the instruction cache memory 22A in a first to a fourth instruction maintaining units RB1-RB4. The selectors 23 and 24 select and output the maintained data in a word unit according to, for example, a lower portion of an address AD.

When the address AD output from the CPU 21 is hit in the instruction cache memory 22A, data for one cache line corresponding to the address is read from the instruction cache memory 22A. When data corresponding to the address AD is not present in the instruction cache memory 22A (cache miss), an access to the main memory is performed and a data reading for the data is performed after data corresponding to the address AD is stored in the instruction cache memory 22A.

The instruction stored in each word among data read from the instruction cache memory 22A is supplied to the selector 23 and maintained in the first to the fourth instruction maintaining units RA1-RA4. The program ID stored in each word among data read from the instruction cache memory 22A is supplied to the selector 24 and maintained in the first to the fourth program ID maintaining units RB1-RB4. When the CPU 21 is provided with a single-issue pipeline which executes a single instruction with a clock, four instructions maintained in the first to the fourth instruction maintaining units RA1-RA4 of the selector 23 are sequentially selected according to an instruction fetch request from the CPU 21 and supplied to the CPU 21.

In accordance with supplying the instruction from the selector 23 to the CPU 21, the program ID, corresponding to the instruction, maintained in the first to the fourth program ID maintaining units RB1-RB4 of the selector 24 is supplied from the selector 24 to the register 25. In this case, the signal S21 output from the CPU 21 is asserted and the program ID is maintained in the register 25. By doing this, the register 25 receives the program ID (IDA) supplied when the instruction is fetched by the CPU 21, otherwise, the register 25 maintains the program ID in a case other than the instruction fetch time.

The decoder 26 may correspond to the decoder 14 illustrated in FIG. 1. The decoder 26 decodes the output IDB of the register 25, for example, the program ID stored in the register 25. The decoder 26 asserts the count signal C21-$i$, for example, sets the count signal C21-$i$ to "1", which instructs the counter<$i$> to count up according to a result of decoding of the program ID. The event selector 27 may correspond to the event selector 15 illustrated in FIG. 1. The event selector 27 outputs the count enable signal CNT to select whether counting up is performed when various events have occurred in the information processing system.

The AND gate 28-$i$ and the counter<$i$> 29-$i$ may be provided to be corresponded to each program ID. The AND gate 28-$i$ and the counter<$i$> 29-$i$ may be corresponded to the AND gate 16-$i$ and the counter<$i$> 17-$i$ illustrated in FIG. 1, respectively. The count signal C21-$i$ output from decoder 26 and the count enable signal CNT output from the event selector 27 are input in the AND gate 28-$i$. The counter<$i$> 29-$i$ operates at the same clock CLK as the operation clock of the CPU 21, and counts up for every period of the clock CLK when an output of the corresponding AND gate 28-$i$ is asserted, for example, set to "1".

When the execution time of each routine (function) is measured, an output of the AND gate 28-$i$ corresponding to the program ID of the routine (function) being executed is asserted, and the count value of the counter<$i$> 29-$i$ is counted up for every period of the clock CLK. For example, each counter<$i$> 29-$i$ counts the number of clocks for execution of the corresponding routine (function). Therefore, the counter value of each counter<$i$> 29-$i$ is read after an execution of the program to be measured is ended and thus, the execution time of each routine (function) included in the program to be measured may be obtained.

When the number of times that the event has occurred is measured during execution of each routine (function), an output of the AND gate 28-$i$ corresponding to the program ID of routine (function) being executed is asserted at the time of occurrence of a target event and the count value of the counter<$i$> 29-$i$ is counted up. For example, each counter<$i$> 29-$i$ counts the number of times that the event has occurred during execution of the corresponding routine (function). Therefore, the counter value of each counter<$i$> 29-$i$ is read after an execution of the program to be measured is ended and thus, the number of times that the event has occurred in each routine (function) included in the program to be measured may be obtained.

The performance profiling may be performed without affecting the original program operation. The program execution information is collected at a short sampling interval.

When the program to be measured is deployed in an executable form in the main memory which is external to the operation processing apparatus, the instruction of the program may be stored in a continuous area of the main memory. Therefore, the instruction of the same routine (function) may be stored in one cache line unit read into the instruction cache memory 22A in the main memory. In the instruction cache memory, the program ID may not be stored in every word of the cache line illustrated in FIG. 4. The program ID may be stored in every cache line illustrated in FIG. 5. The performance profiling having a better precision (accuracy) may be performed while the instruction cache memory capacity is decreased to reduce cost.

Figure 5:
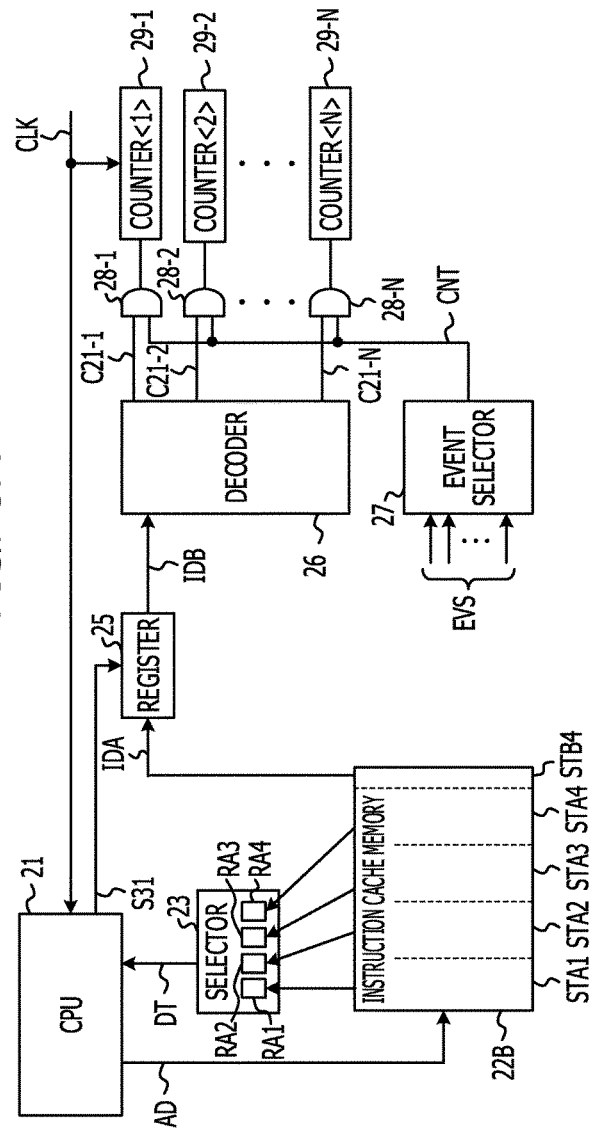
FIG. 5A illustrates an example of an operation processing apparatus.
FIG. 5B illustrates an example of a data storage area of a cache.

FIG. 5A illustrates an example of an operation processing apparatus. The operation processing apparatus illustrated in FIG. 5 may be a performance profiling apparatus. In FIG. 5A, the same reference numerals are given to substantially the same or similar elements as those illustrated in FIG. 4A, and the descriptions thereof may be omitted or reduced. The instruction cache memory 22B of the operation processing apparatus illustrated in FIG. 5A stores some of instructions of the program stored in the main memory. Also, the instruction cache memory 22B in which one cache line corresponding to a management unit (unit accessed concurrently) is composed of 4 (four) words is illustrated in FIG. 5A.

The instruction cache memory 22B includes the first to the fourth data storage areas STA1-STA4 and the program ID storage area STB in one cache line. FIG. 5B illustrates an example of a data storage area in a cache. As illustrated in FIG. 5B, the instructions <DAT1>-<DAT4> are stored in each of data the storage area STA1-STA4, respectively, and the program ID<ID> indicating which routine (function) the instruction <DAT1>-<DAT4> is relevant to, is stored in the program ID storage area STB.

In the operation processing apparatus illustrated in FIG. 5, the CPU 21 asserts the signal S31 to be output to the register 25 when reading data according to an address AD from the instruction cache memory 22B. Therefore, when data according to the address AD from the instruction cache memory 22B is read, the register 25 receives and stores the program ID (IDA) supplied from the instruction cache memory 22B.

Figure 6:
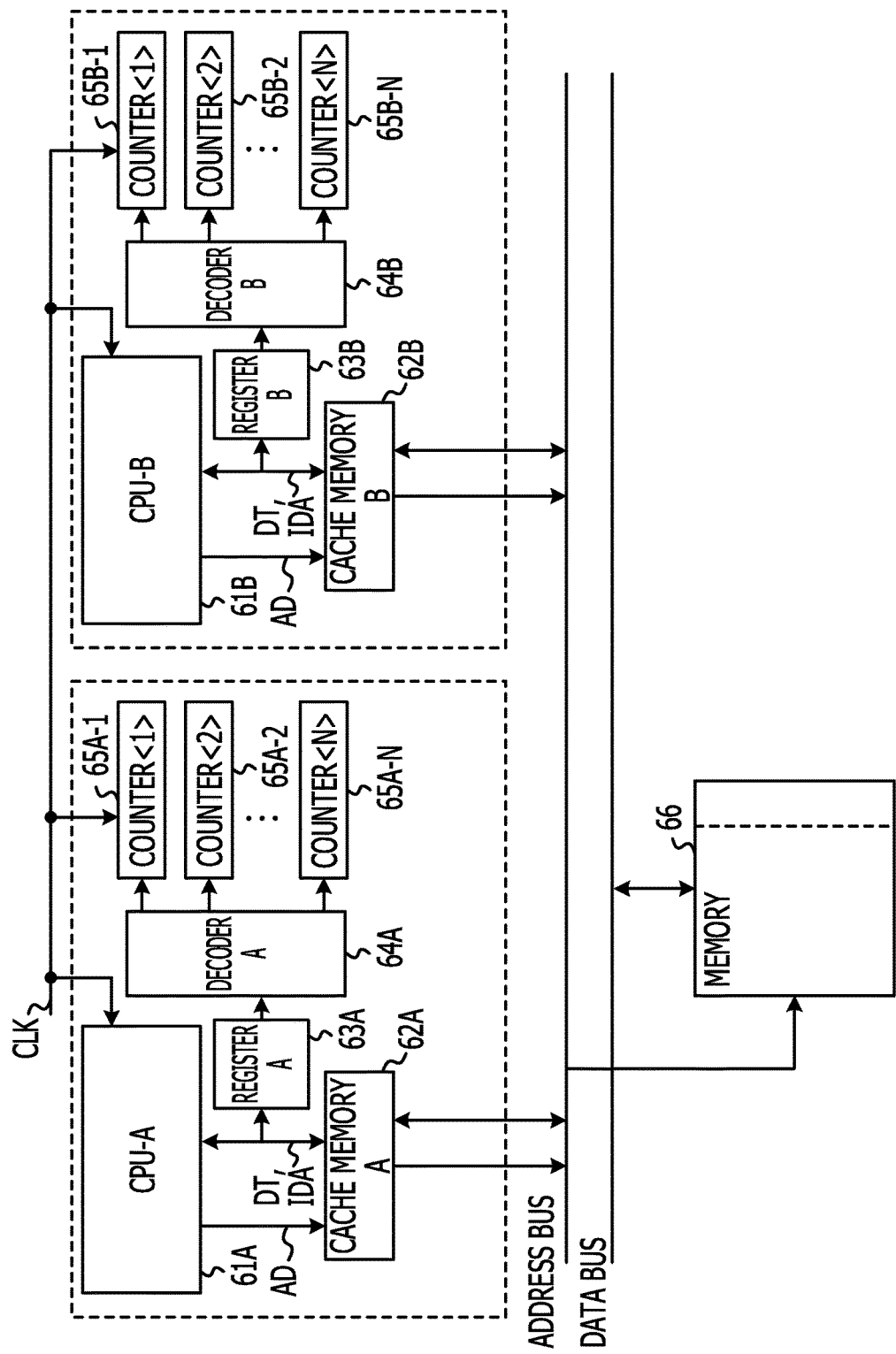
FIG. 6 illustrates an example of an information processing system.

FIG. 6 illustrates an example of a information processing system. The information processing system illustrated in FIG. 6 may be a performance profiling apparatus. The information processing system illustrated in FIG. 3 includes a plurality of operation processing apparatuses, and may be, for example, a multi-CPU system. In FIG. 6, a Symmetric Multiple Processor (SMP) architecture in which the main memory 66 is shared by the respective operation processing apparatuses may be adopted. In FIG. 6, an internal configuration of the operation processing apparatus is simplified, but each operation processing apparatus may be, for example, the operation processing apparatus illustrated in FIG. 4A or FIG. 5A.

A first operation processing apparatus includes a CPU-A61A, an instruction cache memory A62A, a register A63A, a decoder A64A, and a counter A<i> 65A-i. The CPU-A61A, the instruction cache memory A62A, the register A63A, the decoder A64A and the counter A<i> 65A-i may be corresponded to the CPU 21, the instruction cache memory 22A or 22B, the register 25, the decoder 26, and the counter<i> 29-i illustrated in FIG. 4A or FIG. 5A, respectively.

A second operation processing apparatus includes a CPU-B61B, an instruction cache memory B62B, a register B63B, a decoder B64B, and a counter B<i> 65B-i. The CPU-B61B, the instruction cache memory B62B, the register B63B, the decoder B64B, and the counter B<i> 65B-I may be corresponded to the CPU 21, the instruction cache memory 22A or 22B, the register 25, the decoder 26, and the counter<i> 29-i illustrated in FIG. 4A or FIG. 5A, respectively.

Each operation processing apparatus may access the main memory 66 external to the operation processing apparatus through an address bus and a data bus. In FIG. 6, the AD may be an address output from the CPU. The DT may be data input/output between the CPU and the cache memory. The IDA may be the program ID read from the instruction cache memory. The CLK may be a clock.

The CPU-A61A of the first operation processing apparatus and the CPU-B61B of the second operation processing apparatus may execute a multi-threaded program. For example, the CPU-A61A starts an execution of the program to be measured having a unique program ID and deployed in an executable form in the main memory 66. The programs are then transferred to the instruction cache memory A62A from the main memory 66 to be executed sequentially. When the program is a multi-threaded program, a new process or thread is created during execution of the program. For example, in a case where the process is created, the created process is stored in a memory as a copy of the original process. In this case, the same program ID as the program ID assigned to the original process may be assigned to the created process.

A program (process, thread) is executed by each operation processing apparatus and thus, the program execution information is collected. After the execution of the program to be measured is ended, the counter values of the counter A<i> 65A-i and the counter B<i> 65B-i corresponding to the same the program ID are read and added. Therefore, an execution time of each routine (function) included in the program to be measured or the number of times that the event has occurred in each routine (function) included in the program to be measured may be obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A performance profiling apparatus comprising:
a plurality of counters provided for a plurality of routines included in a program, respectively;
a storage section configured to store instructions included in the respective routines and identification information indicating the respective routines which are assigned to the respective instructions when converting a source code of the program to an object code by a compiler, the identification information of the respective instructions being stored in a word including the respective instructions of the respective routines;
a processor configured to assert a signal when reading the respective instructions from the word of the storage section and to execute a process according to the respective instructions, wherein the processor does not assert the signal when reading data other than the instructions from the storage section;
a register configured to receive and store the identification information from the same word as the word from which the processor has read the respective instruction of the storage section based on an asserted signal which is asserted by the processor when the respective instructions are supplied to the processor from the word of the storage section, wherein the register does not receive data from the storage section when the signal is not asserted by the processor; and
a counter controller configured to receive the identification information that is output from the register and to instruct, based on a notification that a target event occurs, a first counter designated by the identification information to count up.

2. The performance profiling apparatus according to claim 1,
wherein the counter controller includes a register configured to receive and store the identification information output from the storage section at a specific timing.

3. The performance profiling apparatus according to claim 2, further comprising:
an output portion configured to decode the identification information stored in the register and output an instruction to count up to the counter based on a decoding result.

4. The performance profiling apparatus according to claim 1,
wherein the counter controller instructs the first counter to count up for every one period of a clock.

5. The performance profiling apparatus according to claim 1,
wherein the counter controller selects the target event from occurrences of various events and notifies the first counter of occurrence of the target event.

6. The performance profiling apparatus according to claim 1,
wherein the storage section is a memory external to an operation processing apparatus including the plurality of counters, the processor and the counter controller.

7. The performance profiling apparatus according to claim 6,
wherein the storage section includes a first area in which data is stored and a second area in which an error correction code of the data is stored, and stores the identification information of the routine in the second area at the time of measuring a program performance.

8. The performance profiling apparatus according to claim 1, wherein the routine includes a main routine and a subroutine which is called in the main routine.

9. A performance profiling method comprising:
storing, in a storage section, instructions each included in respective routines included in a program and identification information indicating the respective routines which are assigned to the respective instructions when converting a source code of the program to an object code by a compiler, the identification information of the respective instructions being stored in a word including the respective instructions of the respective routines;
asserting, by a processor, a signal when reading the respective instructions from the word of the storage section and executing a process according to the respective instructions, wherein the processor does not assert the signal when reading data other than the instructions from the storage section;
storing, in a register, the identification information from the same word as the word from which the processor has read the respective instruction of the storage section based on an asserted signal which is asserted by the processor when the respective instructions are supplied to the processor from the word of the storage section, wherein the register does not receive data from the storage section when the signal is not asserted by the processor; and
counting up, based on a notification that a target event occurs, at a counter designated by the identification information, which is received from the register, among from a plurality of counters provided for the plurality of routines, respectively.

10. The performance profiling method according to claim 9, further comprising:
receiving and storing the identification information output from the storage section at a specific timing.

11. The performance profiling method according to claim 9, further comprising:
decoding the identification information; and
outputting an instruction to count up to the counter based on a decoding result.

12. The performance profiling method according to claim 9, further comprising:
instructing the counter to count up for every one period of a clock.

13. The performance profiling method according to claim 9, wherein the storage section includes a first area in which data is stored and a second area in which an error correction code of the data is stored, and the identification information of the routine is stored in the second area at the time of measuring a program performance.

14. The performance profiling method according to claim 9, wherein the routine includes a main routine and a subroutine which is called in the main routine.

* * * * *